United States Patent
Li et al.

(10) Patent No.: US 8,111,268 B2
(45) Date of Patent: Feb. 7, 2012

(54) IMAGE SCALING METHOD AND APPARATUS

(75) Inventors: Hsiang-Tsun Li, San Diego, CA (US);
Kalin Atanassov, San Diego, CA (US);
Szepo Robert Hung, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1006 days.

(21) Appl. No.: 11/409,456

(22) Filed: Apr. 20, 2006

(65) Prior Publication Data

US 2007/0248286 A1    Oct. 25, 2007

(51) Int. Cl.
G09G 5/00 (2006.01)
G06F 17/00 (2006.01)
G06T 1/00 (2006.01)

(52) U.S. Cl. ........ 345/660; 345/418
(58) Field of Classification Search .......... 382/298; 345/660
See application file for complete search history.

(56) References Cited

U.S. PATENT DOCUMENTS

| | | | | |
|---|---|---|---|---|
| 5,838,387 A * | 11/1998 | Allen et al. | | 348/581 |
| 6,681,059 B1 * | 1/2004 | Thompson | | 382/298 |
| 6,903,733 B1 * | 6/2005 | Greenberg et al. | | 345/204 |
| 7,277,101 B2 | 10/2007 | Zeng | | |
| 2005/0068338 A1 * | 3/2005 | Zeng | | 345/660 |
| 2005/0180658 A1 | 8/2005 | Curry et al. | | |
| 2005/0184993 A1 * | 8/2005 | Ludwin et al. | | 345/502 |
| 2006/0222083 A1 * | 10/2006 | Klein Gunnewiek | | 375/240.29 |

FOREIGN PATENT DOCUMENTS

| | | |
|---|---|---|
| CN | 1655577 | 8/2005 |
| EP | 1566764 | 8/2005 |
| JP | 2005228332 A | 8/2005 |
| JP | 2006511138 T | 3/2006 |
| WO | WO2004044843 | 5/2004 |
| WO | WO2005055139 | 6/2005 |

OTHER PUBLICATIONS

Schniter, Phil; "EE-597 Class Notes—Sub-Band Coding"; EE-597: Audio Signal Processing—Coding and Restoration; Jun. 11, 2004; pp. 1-25; Cornell University; Ithaca, NY, USA.
International Search Report and Written Opinion—PCT/US2007/067020, International Search Authority—European Patent Office—Sep. 26, 2007.

* cited by examiner

*Primary Examiner* — Kee M Tung
*Assistant Examiner* — Jacinta M Crawford
(74) *Attorney, Agent, or Firm* — Alex C. Chen; James R. Gambale, Jr.

(57) ABSTRACT

A method and apparatus for down scaling image data is disclosed. One method controls a phase for an M/N filter, where N represents a number of input samples, and M represents a number of output samples. N is greater than M. Another method may switch between an M/N filter and a phase-controlled M/N filter.

17 Claims, 10 Drawing Sheets

N: input pixel number
M: output pixel number
Qs: # of fractional bits in phase
Q1: Q format for the phase scaling
S1 : (1.0/M)*(1<<(Q1+Qs))

IMAGE SCALING METHOD AND APPARATUS

TECHNICAL FIELD

The present application relates to image processing, and more particularly, to image scaling.

BACKGROUND

Image sensors for video applications may sample a scene. Image processing techniques may provide high quality, color still or video images. Examples of image processing techniques include color correction, demosaicing and scaling. Image processing may improve visual image quality attributes, such as tone reproduction, color saturation, hue reproduction and sharpness.

SUMMARY

One aspect relates to a method of down scaling image data from N input samples to M output samples, where N is greater than M. The method comprises scaling an input sample relative to a phase of an output sample; adding the scaled sample to an average of preceding input samples to provide a sum; normalizing the sum based on scaling of the scaled sample and the preceding input samples to achieve unity gain; based on the normalized sum, generating an output sample; and initializing the sum to a scaled version of the scaled input sample with scaling corresponding to a phase delay of the output sample.

Another aspect relates to a method of down scaling image data from N input samples to M output samples, where N is greater than M. The method comprises summing a first set of image data input samples, wherein the first set comprises at least one first fractional image data input sample; dividing the summed first set of image data input samples by a fractional number to produce a first output sample; summing a second set of image data input samples, wherein the second set comprises at least one second fractional image data input sample; and
dividing the summed second set of image data input samples by the fractional number to produce a second output sample.

Another aspect relates to a method comprising down scaling a first set of image data with a M/N filter, where N represents a number of input samples, and M represents a number of output samples, where N is greater than M; and down scaling a second set of image data with a phase-controlled M/N filter.

Another aspect relates to a method of down scaling image data from N input samples to M output samples, where N is greater than M. The method comprises incrementing a counter by M; incrementing a phase by (1<<Qs), where Qs represents a number of fractional bits in a phase; determining whether the counter is greater than or equal to N; if the counter is not greater than or equal to N, updating accum=accum+(input<<Qs) and step=step+(1<<Qs); if counter is greater than or equal to N, calculating an output phase=phase−phase_out, D1=phase>>Q1, D2=(1<<Qs)−D1, and step=step+D2, where Q1 represents Q format for phase scaling, phase_out represents (N/M)*(1<<Q1); calculating an output sample=(accum+(input*D2))/step; and resetting accum=D*input, step=D1, count=count−N.

Another aspect relates to a method of down scaling image data from N input samples to M output samples, where N is greater than M. The method comprises incrementing a counter by M; determining whether the counter is greater than or equal to N; if the counter is not greater than or equal to N, updating accum=accum+(input<<Qs) and step=step+(1<<Qs), where Qs represents a number of fractional bits in a phase; if counter is greater than or equal to N, calculating an output phase=(count−N)*1, D1=phase>>Q1, D2=(1<<Qs)−D1, and step=step+D2, where Q1 represents Q format for phase scaling; calculating an output sample=(accum+(input*D2))/step; and resetting accum=D*input, step=D1, count=count−N.

Another aspect relates to an apparatus comprising a filter operative to down scale image data from N input samples to M output samples, where N is greater than M. The filter is configured to: scale an input sample relative to a phase of an output sample; add the scaled sample to an average of preceding input samples to provide a sum; normalize the sum based on scaling of the scaled sample and the preceding input samples to achieve unity gain; based on the normalized sum, generate an output sample; and initialize the sum to a scaled version of the scaled input sample with scaling corresponding to a phase delay of the output sample.

Another aspect relates to an apparatus comprising: a means for scaling an input image data sample relative to a phase of an output image data sample; a means for adding the scaled sample to an average of preceding input samples to provide a sum; a means for normalizing the sum based on scaling of the scaled sample and the preceding input samples to achieve unity gain; based on the normalized sum, a means for generating an output sample; and a means for initializing the sum to a scaled version of the scaled input sample with scaling corresponding to a phase delay of the output sample.

Another aspect relates to an apparatus comprising a machine-readable storage medium storing a set of instructions operable to down scale image data from N input samples to M output samples, where N is greater than M. The instructions comprise: summing a first set of image data input samples, wherein the first set comprises at least one first fractional image data input sample; dividing the summed first set of image data input samples by a fractional number to produce a first output sample; summing a second set of image data input samples, wherein the second set comprises at least one second fractional image data input sample; and dividing the summed second set of image data input samples by the fractional number to produce a second output sample.

Another aspect relates to an apparatus comprising a configurable image scaler operative to: down scale a first set of image data with a M/N filter, where N represents a number of input samples, and M represents a number of output samples, where N is greater than M; and down scale a second set of image data with a phase-controlled M/N filter.

Another aspect relates to an apparatus comprising a machine-readable storage medium storing a set of instructions operable to down scale image data from N input samples to M output samples, where N is greater than M. The instructions comprise incrementing a counter by M; incrementing a phase by (<<Qs), where Qs represents a number of fractional bits in a phase; determining whether the counter is greater than or equal to N; if the counter is not greater than or equal to N, updating accum=accum+(input<<Qs) and step=step+(<<Qs); if counter is greater than or equal to N, calculating an output phase=phase−phase_out, D1=phase>>Q1, D2=(<<Qs)−D1, and step=step+D2, where Q1 represents Q format for phase scaling, phase_out represents (N/M)*(1<<Q1); calculating an output sample=(accum+(input*D2))/step; and resetting accum=D*input, step=D1, count=count−N.

Another aspect relates to an apparatus comprising a machine-readable storage medium storing a set of instructions operable to down scale image data from N input samples to M output samples, where N is greater than M. The instructions comprise: incrementing a counter by M; determining whether the counter is greater than or equal to N; if the counter is not greater than or equal to N, updating accum=accum+(input<<Qs) and step=step+(<<Qs), where Qs represents a number of fractional bits in a phase; if counter is greater than or equal to N, calculating an output phase= (count−N)*1, D1=phase>>Q1, D2=(1<<Qs)−D1, and step=step+D2, where Q1 represents Q format for phase scaling; calculating an output sample=(accum+(input*D2))/step; and resetting accum=D*input, step=D1, count=count−N.

The details of one or more embodiments are set forth in the accompanying drawings and the description below.

DETAILED DESCRIPTION

Figure 1:
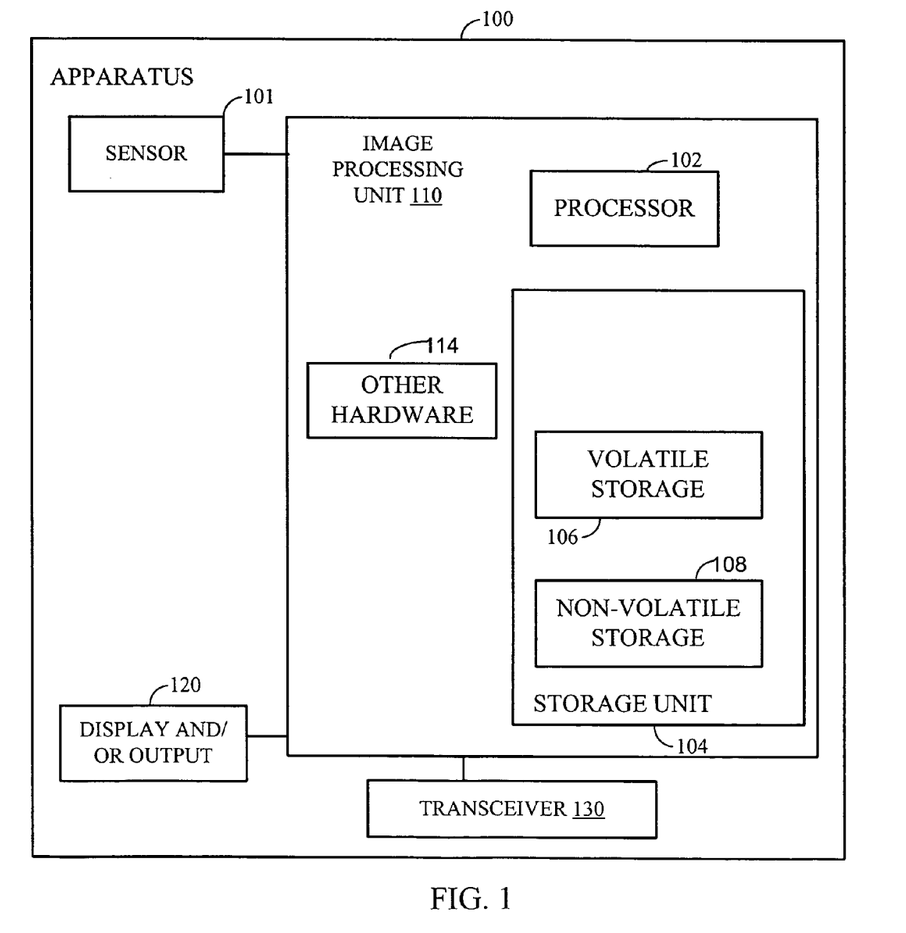
FIG. 1 illustrates an apparatus configured to process digital images.

FIG. 1 illustrates an apparatus 100 configured to process digital images and/or digital video. The apparatus 100 may capture, create, process, modify, scale, encode, decode, transmit, store, and display images and/or video sequences. The apparatus 100 may represent or be implemented in a device, such as a digital television, a digital direct broadcast system, a wireless communication device, a personal digital assistant (PDA), a laptop computer, a desktop computer, a digital camera, a digital recording device, a network-enabled digital television, a cellular phone, a satellite telephone, a terrestrial-based radiotelephone, a direct two-way communication device (sometimes referred to as a "walkie-talkie") or any other device with image processing capabilities.

The apparatus 100 may include a sensor 101, an image processing unit 110, a transceiver 130 and a display and/or output 120. The sensor 101 may be a camera or video camera sensor adapted to capture images or video sequences. The sensor may include color filter arrays (CFAs) arranged on a surface of individual sensors.

The image processing unit 110 may include a processor 102, other hardware 114, and a storage unit 104. The storage unit 104 may store images or video sequences before and after processing. The storage unit 104 may include volatile storage 106 and non-volatile storage 108. The storage unit 104 may comprise any type of data storage means, such as dynamic random access memory (DRAM), FLASH memory, NOR or NAND gate memory, or any other data storage technology.

The image processing unit 110 may process images and/or video sequences. The image processing unit 110 may comprise a chip set for a mobile radiotelephone, which may include hardware, software, firmware, and/or one or more microprocessors, digital signal processors (DSPs), application specific integrated circuits (ASICs), field programmable gate arrays (FPGAs), or various combinations thereof.

The processing unit 110 may include a local memory coupled to a front-end image/video processing unit and an image/video coding unit. The coding unit may comprise an encoder/decoder (CODEC) for encoding (or compressing) and decoding (or decompressing) digital video data. The local memory may comprise a smaller and faster memory space relative to the storage unit 104. For example, the local memory may comprise synchronous dynamic random access memory (SDRAM). The local memory may comprise "on-chip" memory integrated with the other components of the processing unit 110 to provide fast access to data during a processor-intensive coding process.

The image processing unit 110 may perform one or more image processing techniques on frames of a video sequence to improve image quality, and thereby improve the quality of a video sequence. For example, the image processing unit 110 may perform techniques such as demosaicing, lens rolloff correction, scaling, color correction, color conversion, and spatial filtering. The image processing unit 110 may also perform other techniques.

The transceiver 130 may receive and/or transmit coded images or video sequences to another device. The transceiver 130 may use a wireless communication standard such as code division multiple access (CDMA). Examples of CDMA standards include CDMA 1xEV-DO, WCDMA, etc.

In addition to or instead of the elements shown in FIG. 1, other elements may be included in apparatus 100. The architecture illustrated in FIG. 1 is merely an example. The techniques described herein may be implemented with a variety of other architectures.

Downscaling

Downscaling an image may be useful for several reasons. First, downscaling reduces the amount of data stored in memory and/or processed by subsequent image processing modules in hardware. Second, downscaling may be needed for data from an image sensor to be displayed on a liquid crystal display (LCD). Finally, scaling an image may be used for zoom support to resize an image into a desired picture size.

Inputs to a downscaling module may be red, green, blue (R, G, B) or luma and chroma (Y, Cb, Cr) channels. For RGB data, the individual channels may each have the same size (R image size=G image size=B image size). For YCbCr data, the channel sizes may be different. The scaling module may be used for different modes, such as viewfinder mode and capture mode. The module may support processing an entire frame (for viewfinder mode) and/or processing individual blocks (for capture mode). The scaling ratio setting may be configured once for block processing to reduce programming frequency. The horizontal and vertical downscaling ratio may be 1 output sample to 32 input samples to support the minimum viewfinder size (80×48) for an 3 MP sensor input (2048×1600), i.e., (2048/80=25.6) in horizontal scaling and the minimum thumbnail size (48×80) for an 8 MP sensor input (3264×2448), and (2448/80=30.6) in vertical scaling.

M/N Filter

One technique for scaling down an image uses an M/N counter. N represents input pixels (or samples), and M represents output pixels (or samples). An M/N counter increments by M for each input pixel (or sample) and rolls over at N. A pixel is output at each roll over point. Ideally, M and N should be relatively prime numbers. Pseudo-code for an M/N counter may be expressed as:

```
count = 0;
while (1) {
    if (count >= n)
        count = count − n;
    else
        count = count + m;
}
```

Some properties of this counter may include:
The count sequence is periodic with period N;
The roll over points are evenly distributed within one period; and
There are M rollover points within one period.

These properties make this counter attractive for a non-integer image downsizing operation, e.g., M/N=2/5. The following code describes how to use an M/N counter to achieve non-integer image downsizing. The example only performs downsizing in the horizontal direction, but the process can be done similarly in the vertical direction.

```
M = # of horizontal pixels in the new resolution;
N = # of horizontal pixels in the old resolution;
for (x=0; x < N; x++) {
    count = count + M;
    if (count >= N) {
        new_line[index] = (accum + original_line[x])/step;
        accum = 0;
        index++;
        count = count − N;
        step = 1;
    } else {
        accum = accum + original_line[x];
        step++;
    }
}
```

Basically, when N/M is a non-integer (e.g., N/M=5/2), each of the down-scaled M values are computed as an average of either $\lceil N/M \rceil$ values of the input, or $\lfloor N/M \rfloor$ values of the input, where $\lceil x \rceil$ represents the ceiling or the least integer greater than x, and $\lfloor x \rfloor$ represents the floor or the greatest integer lesser than x. For example, if N=5 and M=2, then N/M=5/2=2.5, ceiling(N/M)=3, and floor(N/M)=2. More specifically, N values are mapped into rem(N/M) blocks of $\lceil N/M \rceil$ values of input and M−rem(N/M) blocks of $\lfloor N/M \rfloor$ values of input, i.e., a total of M non-overlapping, contiguous blocks. The term rem(x/y) stands for the remainder of the division between integers x and y. Each of these M blocks are averaged to yield M values of output for every N values of the input. The following equation further shows how N is distributed into M blocks.

$$N = (\text{rem}(N/M))\lceil N/M \rceil + (M - \text{rem}(N/M))\lfloor N/M \rfloor$$

Figure 2:
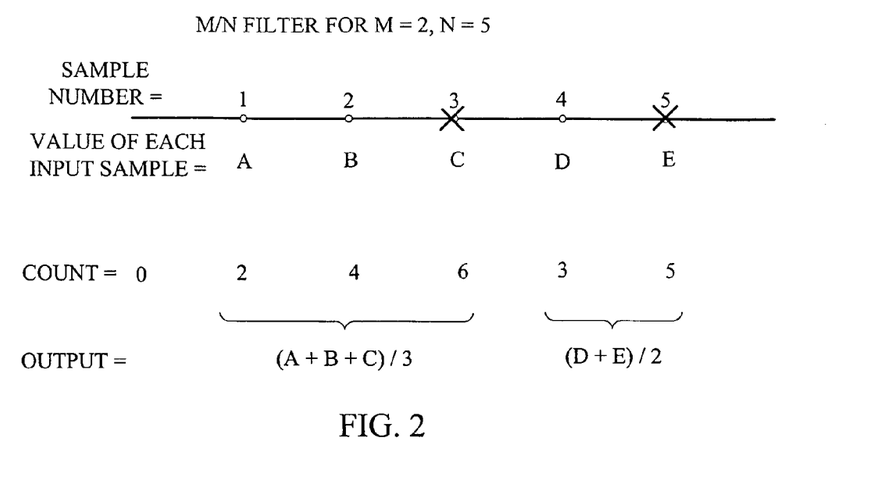
FIG. 2 illustrates an example of using an M/N filter, which may be implemented by the apparatus of FIG. 1.

FIG. 2 illustrates an example of using an M/N filter, which may be implemented by the apparatus 100 of FIG. 1. In FIG. 2, M=2 and N=5, but other values may be used for M and N. The "Xs" at 3 and 5 represent the positions (phases) of two desired output samples. Count starts at 0, then increments by M to 2, 4 and 6. When the count (e.g., 6) is greater than or equal to N, which is 5, a first output is determined. The first output is equal to (A+B+C)/3. The count is reset to 1 and then increments by M to 3 and 5. When the count (e.g., 5) is greater than or equal to N again, a second output is determined, which is equal to (D+E)/2.

In FIG. 2, the "phase increase" (also called sampling period, which corresponds to sampling rate) is "3" for the first output sample at sample 3 and "2" for the second output at sample 5. The phase is not constant. Non-constant phase or rate may lead to jitter (uneven lines) or a visually undesirable scaled image. A constant phase may be desirable in some applications.

Many parameters may be considered when designing an optimal image sub-sampling (down scaling) algorithm. The following properties may be important when designing a sub-sampling system: stop band rejection or aliased energy (the energy that potentially can be aliased in the band of interest; droop (ripple in pass band); and a system's phase response (i.e., non-equal group delay over output samples). The system's phase response becomes an issue when simplified sub-sampling methods, i.e., M/N filtering, are used.

The design process may be further complicated because Fourier analysis cannot be used "as is" to profile system performance. Implementation of a scaling algorithm (software and/or hardware) may impose restrictions on memory consumption (number of taps) and complexity.

The following description analyzes the M/N filter and then introduces a new method that can be used where M/N filtering results do not yield desirable quality.

An M/N filter (M<N) produces averages of ceiling(N/M) and floor(N/M) with a ratio that produces M averaged out of N samples. For example, if N=5 and M=2, then N/M=5/2=2.5, ceiling(N/M)=3, and floor(N/M)=2. An M/N filter represents an attractive hardware solution because it corresponds statewise to a one-tap filter (one sample holder or accumulator). An M/N filter may offer a very efficient and reasonable quality sub-sampling scheme, especially for cases when the sub-sampling ratio is much less than 1.

Two important results should be considered when averaging a different number of elements (e.g., averaging 3 elements for the first output and then averaging 2 elements for the second output in FIG. 2): different aliased energy (stop band rejection) for outputs obtained from different averages; and different sample (phase) delay for outputs obtained from different averages. If N/M is an integer (e.g., sub-sampling rates M/N of 1/1, 1/2, 1/3, . . . , 1/n), then only one average is produced, and the M/N filter then has the same rejection (for all samples) in the stop band frequency (e.g., low pass filter) and phase difference.

For sub-sampling rates generated as (M1+M2)/(N1+N2), where indexes correspond to two adjacent frequencies from the described above list, namely 2/3, 2/5, . . . 2/(2*n+1), the stop band rejection is not uniform across all samples, but phase difference is the same. The phase jitter (output phase is not constant) in terms of output sampling rate of M/N=3/4 can be illustrated as follows:

$$Sout(0) = (Sin(0) + Sin(1))/2$$

$$Sout(1) = Sin(2)$$

$$Sout(2) = Sin(3)$$

$$S(3) = (Sin(4) + Sin(5))/2$$

. . .

With delay $$Sout(0) \rightarrow \tfrac{1}{2}T$$

Sout(1)->2T

Sout(2)->3T

Sout(3)->4½T

The sample delay, which should be 4/3T, is now T for some cases and 1.5T for others. The "safe" sub-sampling ratios or frequencies (the ones with constant sample delay, i.e., constant output phase) and the sample delay differences are shown versus sub-sampling rates (i.e., M/N ratios) in FIG. 4.

Sample delay difference is normalized based on a lower number of averaged symbols, i.e., for sub-sampling ratios of ½ to 1, averages of one and two samples are used to produce the output sequence. Since lesser number of samples is 1, 1 is used to normalize the 0.5 samples delay.

Figure 5:
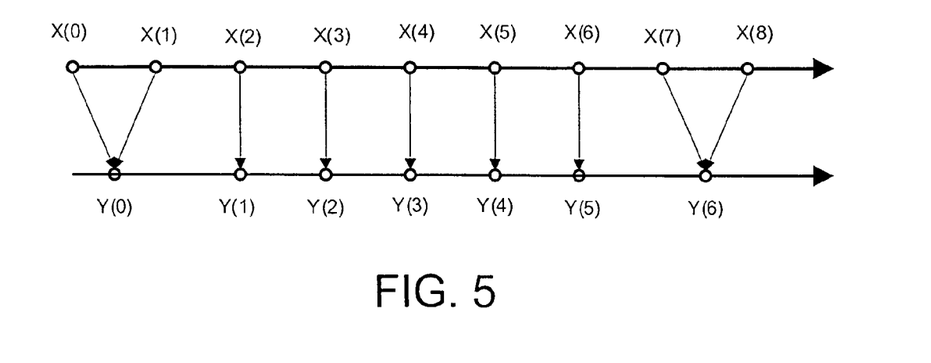
FIG. 5 illustrates an example of inter-sample difference.

A problem then arises for sub-sampling ratios that are very close to other sub-sampling ratios with constant phase difference: one of the two averages is chosen continuously multiple times, while the other average is used once. This is shown in FIG. 5, which illustrates an example of inter-sample difference with sub-sampling of M/N=⁶⁄₇ for illustration. The sample delay can cause a visible defect if it happens at 45 degree lines. The closer to the "safe" frequency, the more visible a defect is.

Although different stop band rejection is observed for sub-sampling rates other than 1, ½, ⅓, ... etc., at some samples, stop band rejection is not sufficient, which may not be not visible. For sub-sampling ratios of 1/Q (Q is not necessarily an integer), if Q samples are used to obtain an average and then output it, the resulting band pass filter is a sinc filter with a first zero at 1/Q*Fs/2. If Q is not an integer, then two sinc filters are alternated: 1/ceil(Q)*Fs/2 and 1/floor(Q)*Fs/2.

Linear Interpolation

For an M/N filter, the sample difference may be worst for the 1 to ½ sub-sampling ratio interval. In that interval, averaging sums of 1 and 2 samples are used. Linear interpolation may provide an effective solution by utilizing samples surrounding the output sample time. Linear interpolation averages two samples. Linear interpolation produces uniform sample delay and provides fixed maximum stop band rejection that is independent of scaling ratio (i.e., constant maximum cutoff frequency for lowpass filter). For example, a regular M/N filter for 1-½ ratio uses:

$$y(n)=k \times (n-1)+(1-k) \times (n)$$

where k is either 0 or ½. Linear interpolation utilizes a range of values for k (based on the implementation) and achieves comparable stop band rejection (on average) while maintaining a constant phase (or sampling rate). Linear interpolation provides a more visually pleasing result for sub-sampling ratios of 1 to ½. But linear interpolation may not support (or be desirable for) very small scaling ratios, e.g., less than ½.

Figure 4:
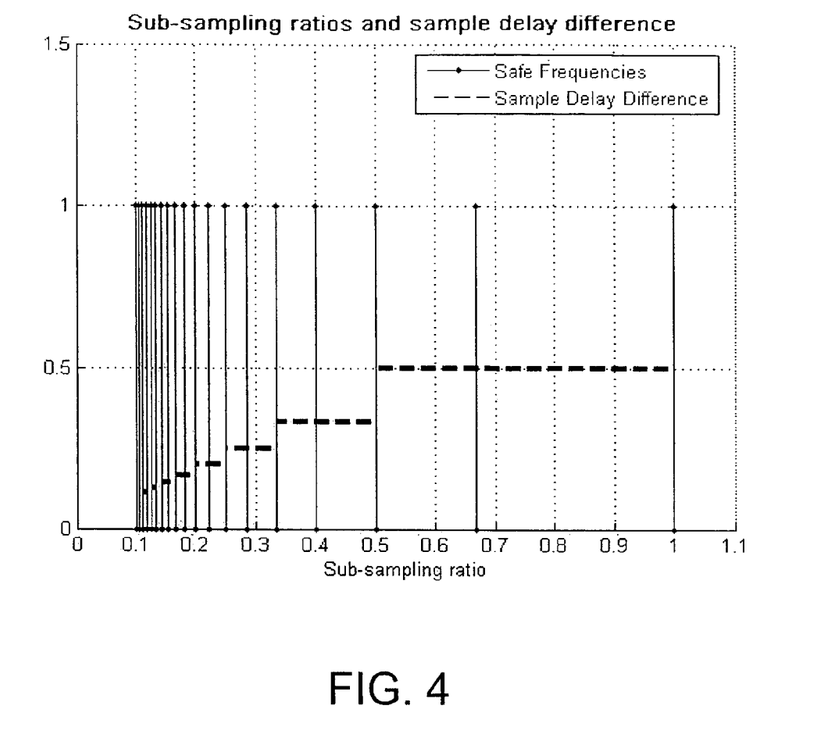
FIG. 4 illustrates sub-sampling ratios and sample delay differences.

In FIG. 4, there is a significant sample delay difference even at lower sub-sampling ratios. For example, for sub-sampling ratios in the range of ½ to ⅓, sample delay difference is 0.33 (normalized) samples. Linear interpolation will provide a constant sample difference but will not have enough rejection in the stop band since linear interpolation only uses two samples that are the closest to the output sample delay. Modifying linear interpolation to cubic in order to include more samples will require preserving the two last samples instead of one, which may make hardware implementation inefficient.

Phase-Controlled M/N Filtering

In order to benefit from the averaging quality of M/N filtering and achieve more constant sample delay associated with linear interpolation, a phase-controlled M/N filter is introduced and described with FIGS. 1, 3, and 6-8.

Figure 8:
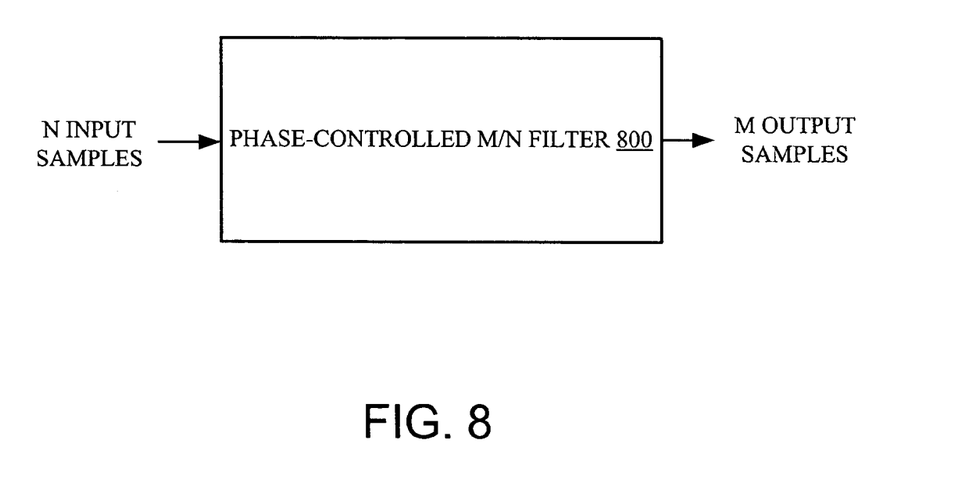
FIG. 8 illustrates a phase-controlled M/N filter, which may be implemented in the apparatus of FIG. 1.

FIG. 8 illustrates a phase-controlled M/N filter 800, which may be implemented in the apparatus 100 of FIG. 1. A phase-controlled M/N filter may work like a regular M/N filter with three exceptions or differences, as shown in FIG. 6.

Figure 6:
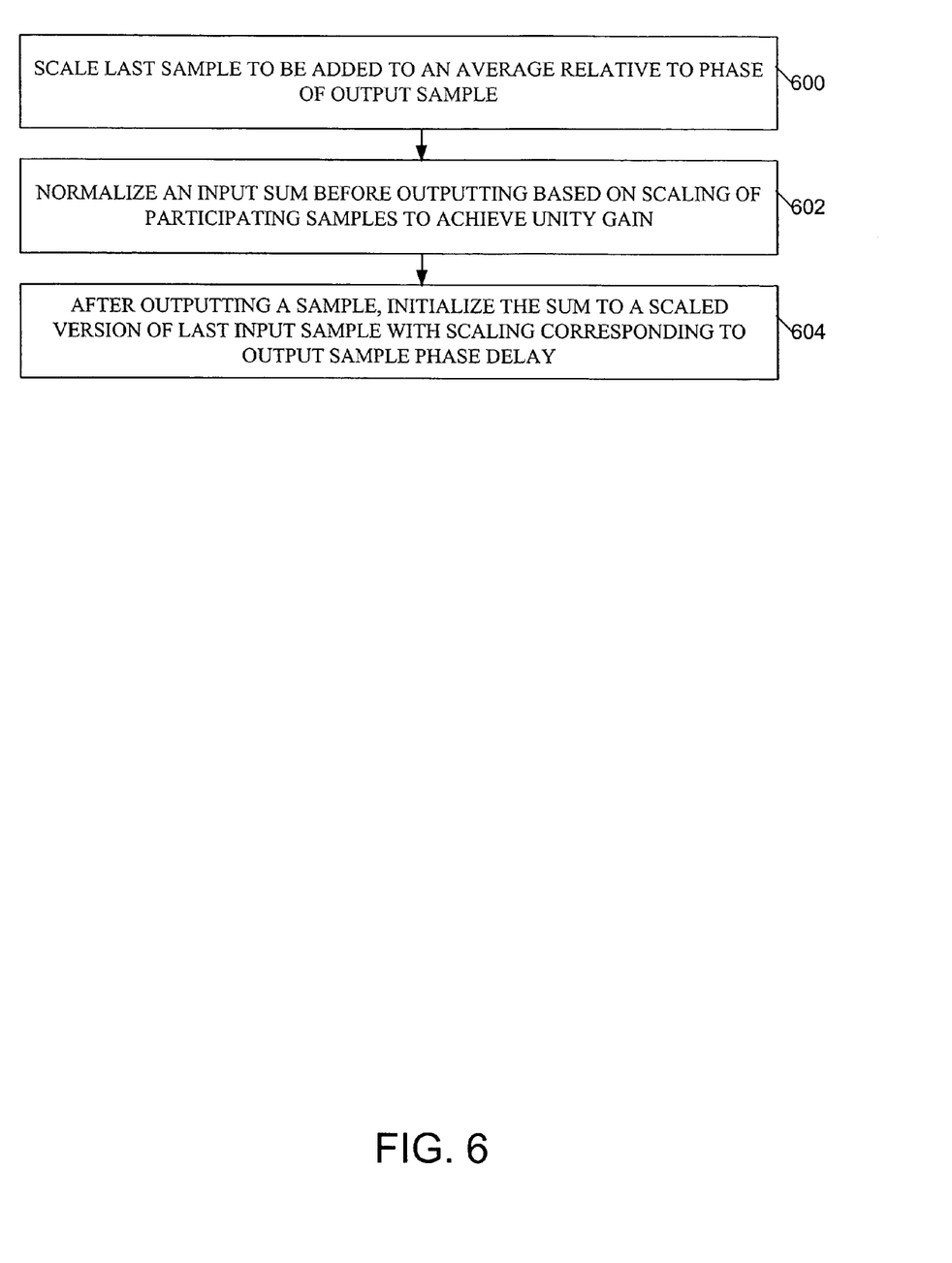
FIG. 6 illustrates a phase-controlled M/N filter method that may be performed by the apparatus of FIG. 1.
Figure 7A:
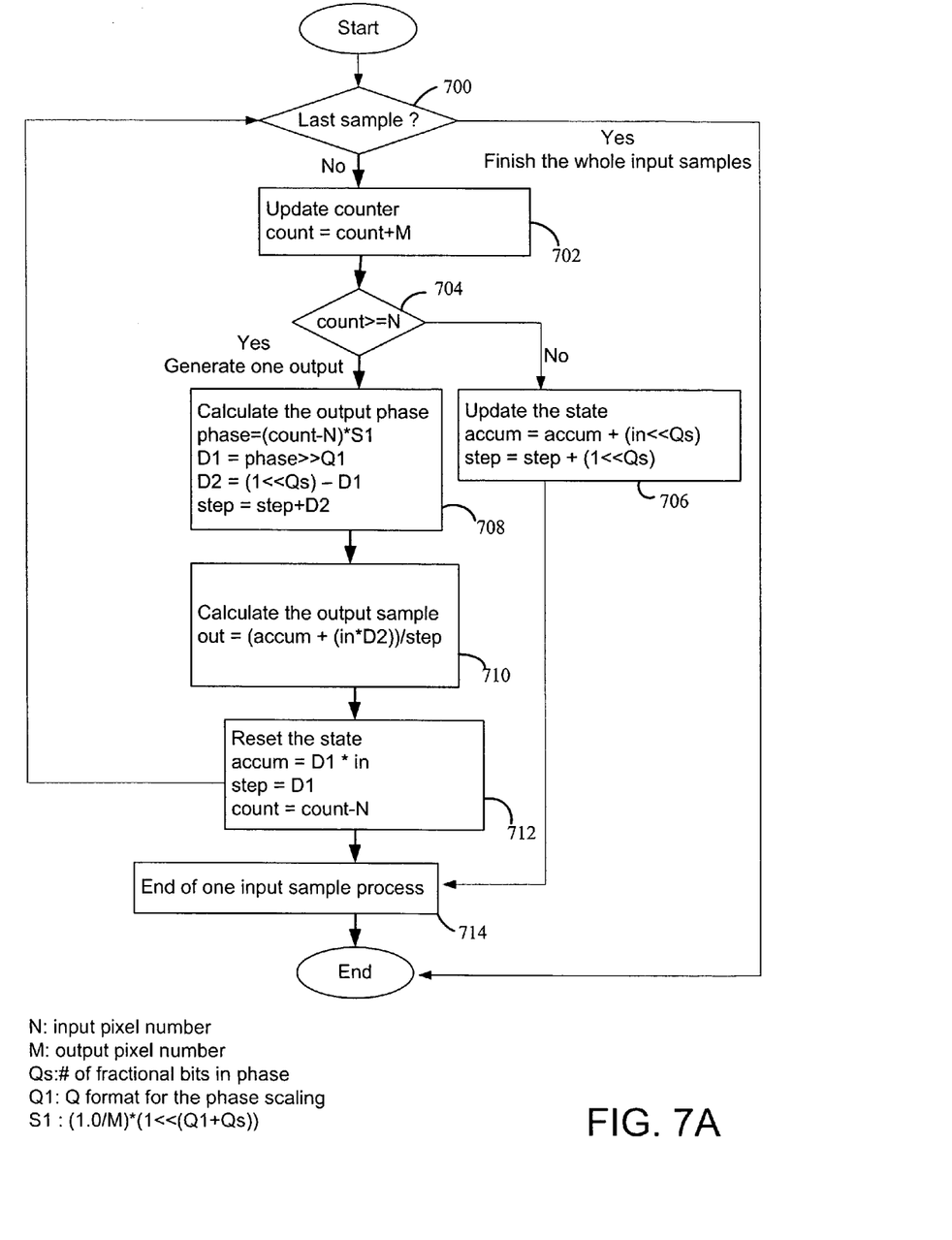
FIG. 7A illustrates a more detailed implementation of the phase-controlled M/N filter method of FIG. 6.
Figure 7B:
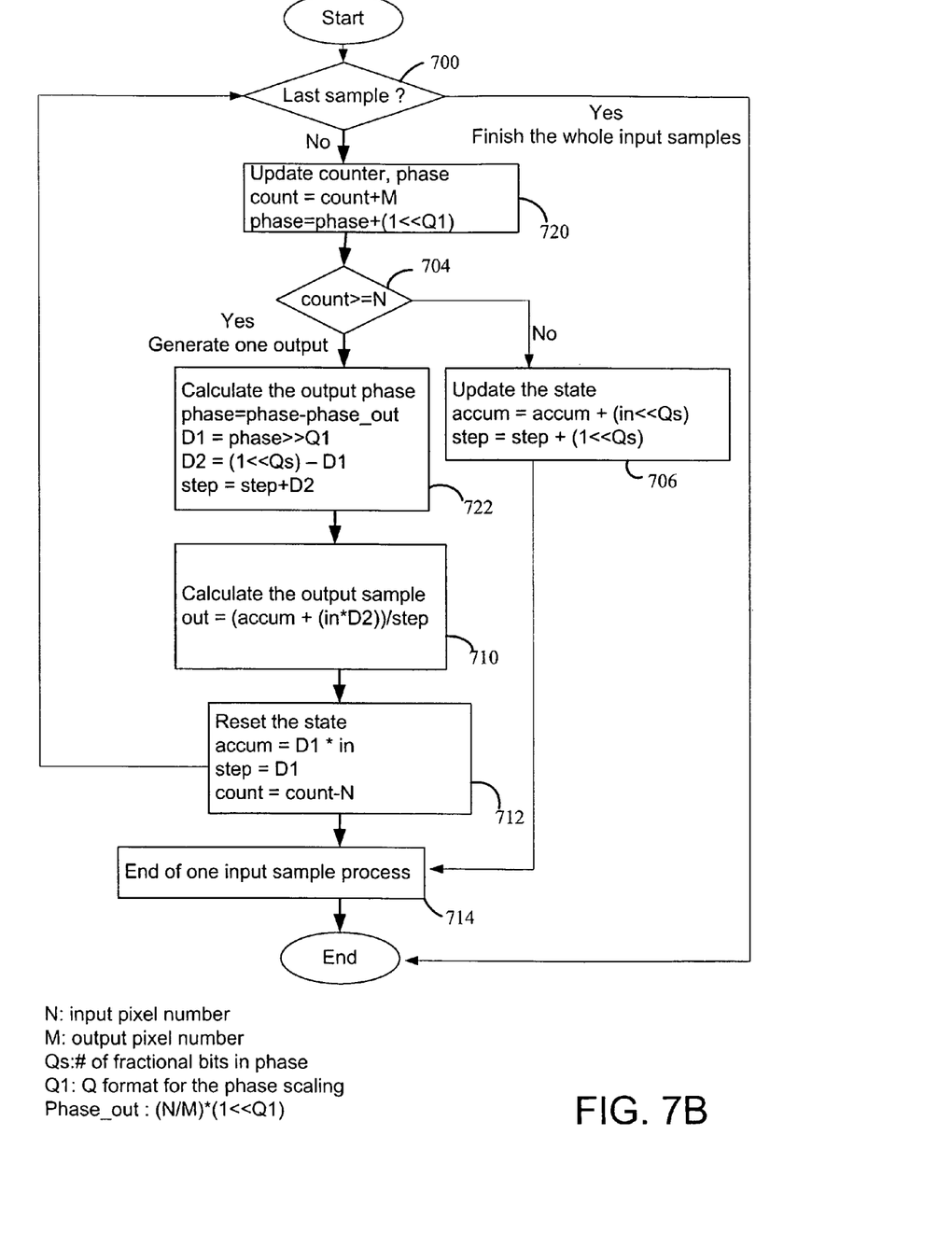
FIG. 7B illustrates another embodiment of the implementation of FIG. 7A.

FIG. 6 illustrates a method with these three exceptions, which may be performed by the apparatus of FIG. 1. In block 600, a phase-controlled M/N filter 800 scales a last input sample (to be added to an average of preceding input samples to provide a sum) relative to a phase of an output sample. This achieves control of the phase difference that would have existed between two output samples using an M/N filter. In block 602, a phase-controlled M/N filter 800 normalizes the input sum (before outputting) based on scaling of participating samples (the scaled sample and the preceding input samples) to achieve unity gain. In block 604, after outputting an output sample, the sum is initialized to a scaled version of the last input sample with scaling corresponding to the phase delay of the last output sample. These operations may be more apparent as FIGS. 3, 7A and 7B are described below.

Figure 3:
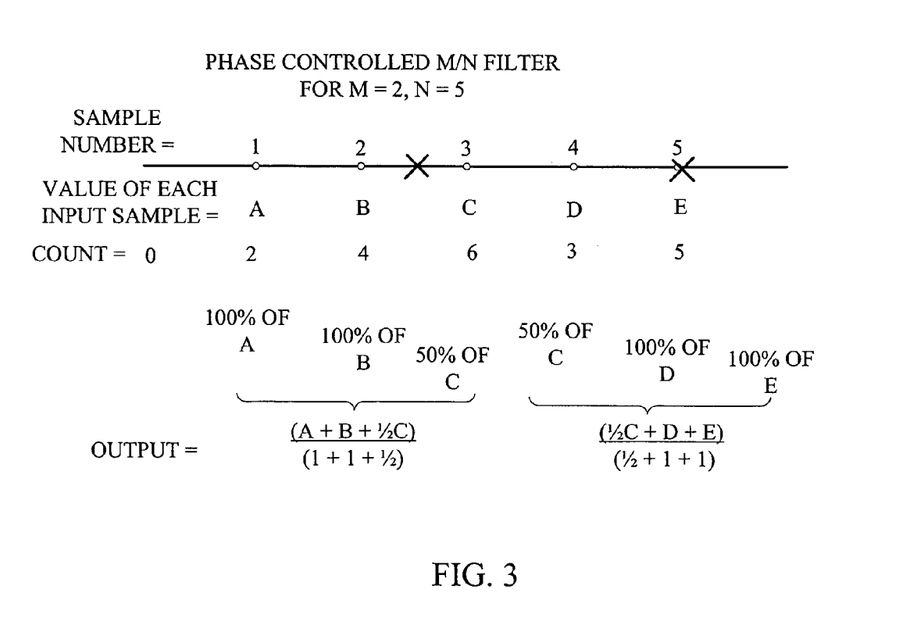
FIG. 3 illustrates an example of using a phase-controlled M/N filter, which may be implemented by the apparatus of FIG. 1.

FIG. 3 illustrates an example of using a phase-controlled M/N filter, which may be implemented by the apparatus 100 of FIG. 1. In FIG. 3, M=2 and N=5, but any value may be used for M, and any value may be used for N. The "Xs" at 2.5 and 5 represent the positions (phases) of two desired output samples. 2.5 represents a fractional (non-integer) phase, which may be programmable by software. A, B, C, D and E represent input sample values. The first output (at 2.5) is equal to (A+B+½C)/(1+1+½), which represents a 2.5 sample average. The division calculation is similar to an M/N filter. ½C represents a weighted input value.

The second output (at 5) is equal to (½C+D+E)/(½+1+1), which has a similar phase (2.5) as the first output. This constant phase (2.5) resembles linear interpolation.

The following C-code sequence represents an example of a phase-controlled M/N filter.

```
M = # of horizontal pixels in the new resolution;
N = # of horizontal pixels in the old resolution;
PHASE_Q_BITS = 3; // number of fraction bits in phase
Q1 = 12; // Q format for the phase scaling
S1 = 1.0/M * (1<<(Q1+ PHASE_Q_BITS)) ; // phase scaling
for (x = 0; x < N; x++) {
    count = count + M;
    if (count >= N) {
        d1 = count – N;
        d1 = d1 * S1;
        d1 = d1 >> Q1;
            d2 = (1<< PHASE_Q_BITS)–d1;
            step += d2;
            new_line[index] = (accum + (original_line[x]*d2))/step;
            accum = d1* original_line [x]; // "accum" holds the output
            sample
            index++;
            count = count – N;
            step = d1;
    } else {
        accum = accum + (original_line[x]<<PHASE_Q_BITS);
        step+=(1<< PHASE_Q_BITS);
    }
}
```

For a 2-megapixel camera, M may be 700, and N may be 1600. The expression "<<" represents a left shift in C programming language, so $1<<(Q1+PHASE\_Q\_BITS)=2^{(Q1+PHASE\_Q\_BITS)}=2^{(12+3)}=2^{15}$. Q1 depends on input size. The expression ">>" represents a right shift. Count may start at zero and increment by M. The expression "x++" means x=x+

1. The expression "d1=d1*S1" means d1 is multiplied by a weight S1. PHASE_Q_BITS is the fractional sampling phase. If PHASE_Q_BITS=3, then there are 8 phase fraction bits.

Applying the code above to FIG. 3, accum=(A+B+½C) and step=(1+1+½) for the first output in FIG. 3.

As the code above shows, a phase-controlled M/N filter may be implemented with little modification on top of an M/N filter and can be reduced to an M/N filter by setting PHASE_Q_BITS=0. If PHASE_Q_BITS=0, the pseudo code above may be the same as an M/N filter, which only considers the integer part of the sampling phase. The bandwidth (stop band rejection) of the phase-controlled M/N filter may be the same as an M/N filter, but with less harmonic noise caused by phase discontinuity. That is achieved by quantizing the output phase at a finer granularity with the phase-controlled M/N filter compared to the M/N filter.

FIG. 7A illustrates the C-code sequence listed above in a flow chart, which is a more detailed implementation of the method of FIG. 6. FIG. 7B illustrates another embodiment of the implementation of FIG. 7A. N represents an input pixel number, and M represents an output pixel number. Qs in FIG. 7A (or PHASE_Q_BITS in the description above) represents a number of fractional bits in a phase. Q1 represents a Q format for phase scaling. S1 represents (1.0/M)*(1<<(Q1+Qs)).

In block 700 of FIG. 7A, the phase-controlled M/N filter determines whether a last sample has been processed. If not, the filter updates counter=count+M in block 702. In block 720 of FIG. 7B, the filter updates counter=count+M and updates phase to phase+(1<<Q1).

In block 704, the filter determines whether count is greater than or equal to N. If not, the filter updates the state in block 706: accum=accum+(input sample<<Qs) and step=step+(1<<Qs).

If count is greater than or equal to N in block 704, the filter calculates output phase, D1, D2 and step in block 708. In block 722 of FIG. 7B, phase is calculated using an adder instead of a multiplier.

In block 710, the filter calculates the output sample.

In block 712, the filter resets the state. Block 714 represents the end of one input sample process.

The phase-controlled M/N filter may reduce to using two samples for 1 to ½ scaling range and using three samples for ½ to ⅓ scaling range, which may be considered rate-controlled stop band rejection.

FIG. 7B illustrates another implementation that uses an adder (block 722), instead of a multiplier (block 708 in FIG. 7A) for phase scaling. The implementation of FIG. 7B may be expressed as:

```
M = # of horizontal pixels in the new resolution;
N = # of horizontal pixels in the old resolution;
PHASE_Q_BITS = 3; //# of fraction bits in phase
Q1= 12;// Q format for the phase scaling
poly_phase_mult = N/M * (1<<Q1) ; // phase scaling
for (x=0; x < N; x++) {
    count = count + M;
    phase_accum = phase_accum + (1<<Q1) ;
        if (count >= N) {
            phase_accum = phase_accum – poly_phase_mult;
            if(phase_accum > (1<<Q1))
                phase_accum = (1<<Q1);
            d1 = phase_accum >> Q1;
            d2 = (1<< PHASE_Q_BITS)–d1;
            step += d2;
            new_line[index] = (accum + (original_line[x]*d2))/step;
```

```
            accum = d1* original_line [x];
            index++;
            count = count – N;
            step = d1;
            }
        else {
            accum = accum + (original_line[x]<<PHASE_Q_BITS);
            step+=(1<< PHASE_Q_BITS);
            }
}
```

Some advantages of phase-controlled M/N filtering may include:

Practically the same quality for sub-sampling ratios of 1-½ when compared with linear interpolation, which is the optimal method when only two points are used;

Capability to work at lower sub-sampling ratios (½-⅓) while maintaining stop band rejection better than linear interpolation and phase response better than an M/N filter;

Can be efficiently inserted or implemented into a M/N filter structure, architecture, and/or system with little or no additional complexity when considering a hardware solution; and The effects of phase control may be turned on and off relatively easily, which reduces a phase-controlled M/N filter to a plain M/N filter.

The phase-controlled M/N filter may combine the advantages of an M/N filter and a linear interpolation filter but without visible disadvantages of either methods. The phase-controlled M/N filter offers a good trade off between phase control and stop band rejection. The phase-controlled M/N filter may be a hardware-efficient solution since it may use the same line buffer as an M/N filter. The phase controlled M/N filter may be a good candidate for 1D or 2D down scaling.

Figure 9:
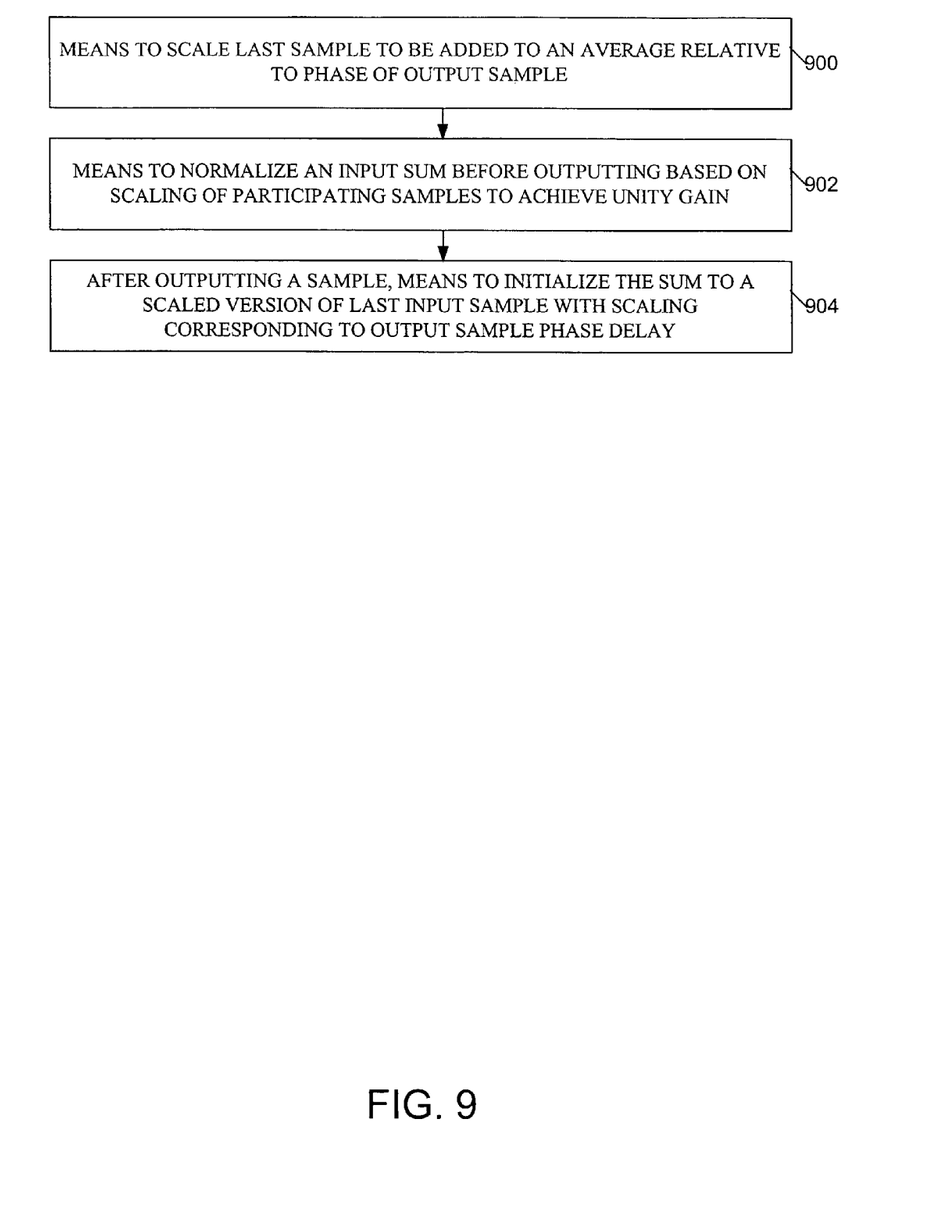
FIG. 9 illustrates a structure corresponding to FIG. 6.

FIG. 9 illustrates a structure corresponding to FIG. 6.

Figure 10A:
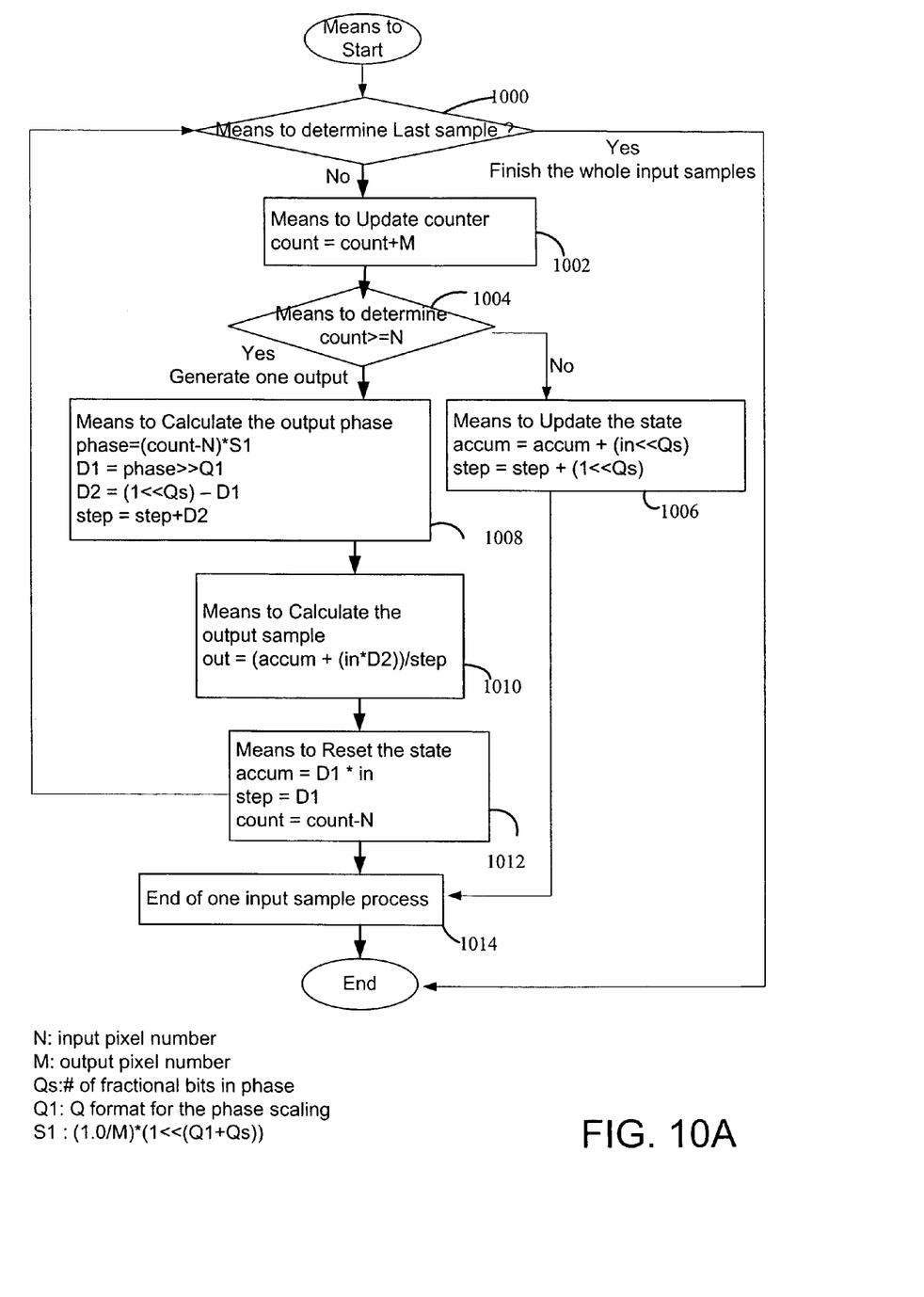
FIG. 10A illustrates a structure corresponding to FIG. 7A.

FIG. 10A illustrates a structure corresponding to FIG. 7A.

Figure 10B:
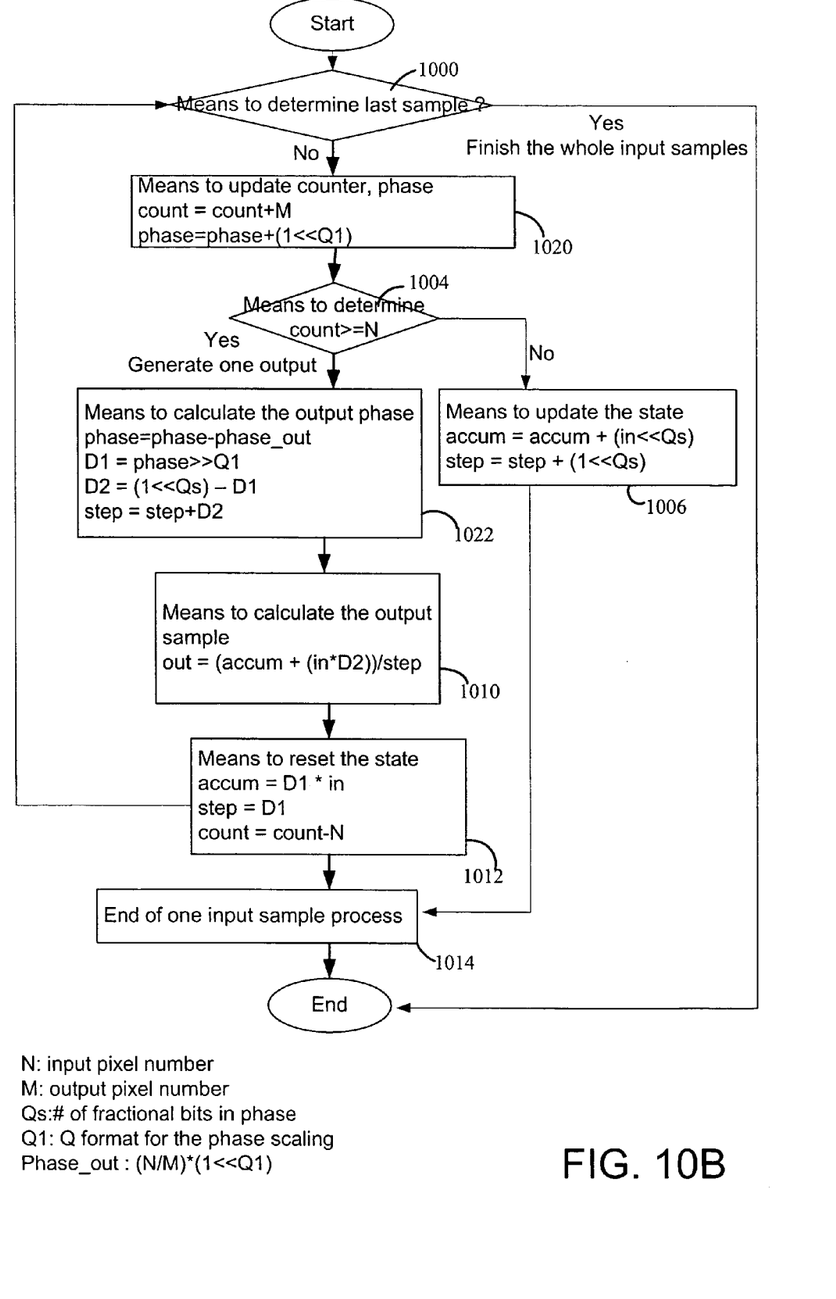
FIG. 10B illustrates a structure corresponding to FIG. 7B.

FIG. 10B illustrates a structure corresponding to FIG. 7B.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as limitations.

The various illustrative logical blocks, modules, and circuits described in connection with the aspects disclosed herein may be implemented or performed with a general purpose processor, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium. A storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Various modifications to the described aspects may be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method of down scaling image data from N input samples to M output samples, where N is greater than M, the method comprising:
   scaling an input sample, in an image scaling apparatus, relative to a phase of an output sample, wherein scaling comprises multiplying the input sample by a fractional weight based on the values of N and M;
   adding the scaled input sample to an average of preceding input samples to provide a sum;
   normalizing the sum based on scaling of the scaled input sample and the preceding input samples to achieve unity gain;
   based on the normalized sum, generating the output sample; and
   initializing the sum to a scaled version of the scaled input sample with scaling corresponding to a phase delay of the output sample.

2. The method of claim 1, wherein the phase comprises a fraction.

3. A method of down scaling image data from N input samples to M output samples, where N is greater than M, the method comprising:
   summing a first set of image data input samples, in an image scaling apparatus, wherein the first set comprises at least one image data input sample multiplied by a first fractional weight based on the values of N and M;
   dividing the summed first set of image data input samples by a fractional number to produce a first output sample;
   summing a second set of image data input samples, wherein the second set comprises at least one image data input sample multiplied by a second fractional weight based on the values of N and M; and
   dividing the summed second set of image data input samples by the fractional number to produce a second output sample.

4. The method of claim 3, further comprising transmitting the first and second output samples across a wireless channel.

5. The method of claim 3, further comprising displaying the first and second output samples.

6. A method of down scaling image data from N input samples to M output samples, where N is greater than M, comprising:
   incrementing, in an image scaling apparatus, a counter by M;
   incrementing a phase by (1<<Qs), where Qs represents a number of fractional bits in a phase;
   determining whether the counter is greater than or equal to N;
   if the counter is not greater than or equal to N, updating accum=accum+(input<<Qs) and step=step+(1<<Qs);
   if the counter is greater than or equal to N, calculating an output phase=phase−phase_out, D1=phase>>Q1, D2=(1<<Qs)−D1, and step=step+D2, where Q1 represents Q format for phase scaling, phase_out represents (N/M)*(1<<Q1); and
   calculating an output sample=(accum+(input*D2))/step; and
   resetting accum=D*input, step=D1, count=count−N.

7. The method of claim 6, further comprising:
   determining whether a last input sample has been processed; and
   if not, continuing to process input samples.

8. A method of down scaling image data from N input samples to M output samples, where N is greater than M, comprising:
   incrementing, in an image scaling apparatus, a counter by M;
   determining whether the counter is greater than or equal to N;
   if the counter is not greater than or equal to N, updating accum=accum+(input<<Qs) and step=step+(<<Qs), where Qs represents a number of fractional bits in a phase;
   if the counter is greater than or equal to N, calculating an output phase=(count−N)*1, D1=phase>>Q1, D2=(1<<Qs)−D1, and step=step+D2, where Q1 represents Q format for phase scaling;
   calculating an output sample=(accum+(input*D2))/step; and
   resetting accum=D*input, step=D1, count=count−N.

9. An apparatus comprising:
   a means for scaling an input sample relative to a phase of an output image data sample, wherein the means for scaling comprises a means for multiplying the input sample by a fractional weight based on the values of N and M;
   a means for adding the scaled input sample to an average of preceding input samples to provide a sum;
   a means for normalizing the sum based on scaling of the scaled input sample and the preceding input samples to achieve unity gain;
   based on the normalized sum, a means for generating an output sample; and
   a means for initializing the sum to a scaled version of the scaled input sample with scaling corresponding to a phase delay of the output sample.

10. An apparatus comprising a machine-readable storage medium storing a set of instructions operable to down scale image data from N input samples to M output samples, where N is greater than M, the instructions executable by a computer to:
   sum a first set of image data input samples, wherein the first set comprises at least one image data input sample multiplied by a first fractional weight based on the values of N and M;

divide the summed first set of image data input samples by a fractional number to produce a first output sample;

sum a second set of image data input samples, wherein the second set comprises at least one image data input sample multiplied by a second fractional weight based on the values of N and M; and divide the summed second set of image data input samples by the fractional number to produce a second output sample.

11. The apparatus of claim 10, wherein the apparatus comprises a digital camera.

12. The apparatus of claim 10, wherein the apparatus comprises a wireless communication device, the apparatus further comprising a transceiver operable to transmit the first and second output samples across a wireless communication channel.

13. An apparatus comprising a machine-readable storage medium storing a set of instructions operable to down scale image data from N input samples to M output samples, where N is greater than M, the instructions executable by a computer to:

increment a counter by M; incrementing a phase by (1<<Qs), where Qs represents a number of fractional bits in a phase;

determine whether the counter is greater than or equal to N;

if the counter is not greater than or equal to N, update accum=accum+(input<<Qs) and step=step+(1<<Qs);

if the counter is greater than or equal to N, calculate an output phase=phase−phase_out, D1=phase>>Q1, D2=(1<<Qs)−D1, and step=step+D2, where Q1 represents Q format for phase scaling, phase_out represents (N/M)*(<<Q1);

calculate an output sample=(accum+(input*D2))/step; and reset accum=D*input, step=D1, count=count−N.

14. An apparatus comprising a machine-readable storage medium storing a set of instructions operable to down scale image data from N input samples to M output samples, where N is greater than M, the instructions executable by a computer to:

increment a counter by M;

determine whether the counter is greater than or equal to N;

if the counter is not greater than or equal to N, update accum=accum+(input<<Qs) and step=step+(1<<Qs), where Qs represents a number of fractional bits in a phase;

if the counter is greater than or equal to N, calculate an output phase=(count−N)*1, D1=phase>>Q1, D2=(1<<Qs)−D1, and step=step+D2, where Q1 represents Q format for phase scaling;

calculate an output sample=(accum+(input*D2))/step; and reset accum=D*input, step=D1, count=count−N.

15. An apparatus comprising a machine-readable storage medium storing a set of instructions operable to down scale image data from a number of input samples to a number of output samples, where the number of input samples is greater than the number of output samples, the instructions executable by a computer to:

increment a counter by the number of output samples to generate an incremented counter value;

compare the incremented counter value to the number of input samples;

while the incremented counter value is less than the number of input samples, iteratively update a temporary value and a step value; and when the incremented counter value is greater than or equal to the number of input samples, calculate an output phase, calculate an output sample based on the temporary value and the step value, and reset the temporary value and the step value.

16. The apparatus of claim 15, wherein the temporary value comprises an accumulated value.

17. The apparatus of claim 15, wherein the machine-readable storage medium is disposed within at least one of: a television, a digital direct broadcast system, a wireless communication device, a personal digital assistant, a laptop computer, a desktop computer, a digital camera, a digital recording device, a cellular phone, a satellite telephone, a terrestrial-based radiotelephone, and a direct two-way communication device.

* * * * *